March 19, 1963  T. G. BROWN  3,081,812
BRANCH LINE CONNECTION TOOL
Filed May 9, 1960  2 Sheets-Sheet 1
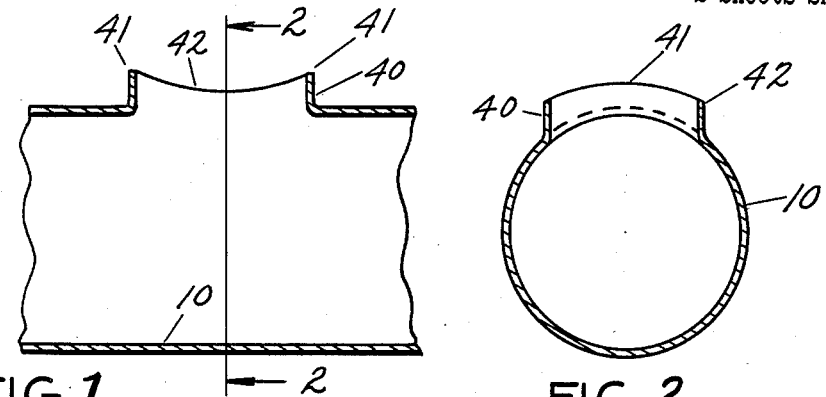
FIG. 1  FIG. 2
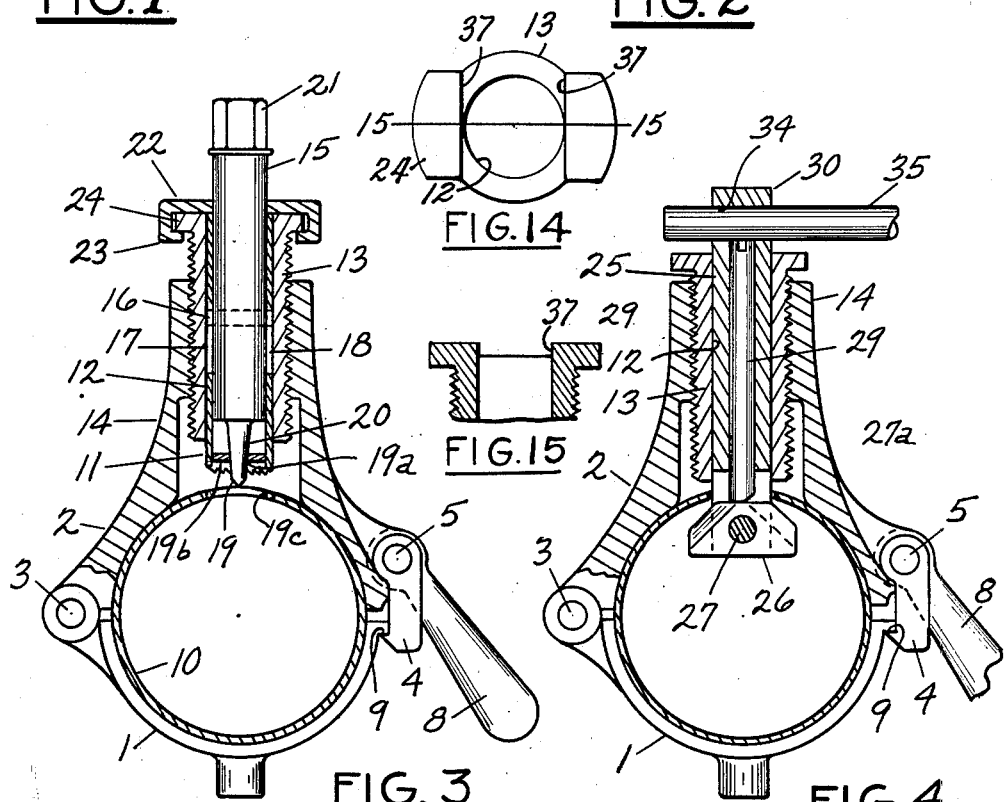
FIG. 14  FIG. 15
FIG. 3  FIG. 4
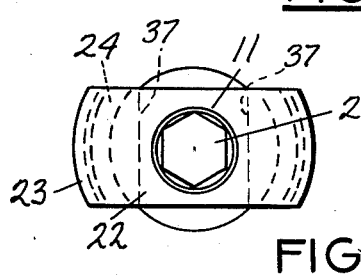
FIG. 7
INVENTOR.
Thomas G. Brown
BY Ralph Hammar
Attorney March 19, 1963
T. G. BROWN
3,081,812
BRANCH LINE CONNECTION TOOL
Filed May 9, 1960
2 Sheets-Sheet 2
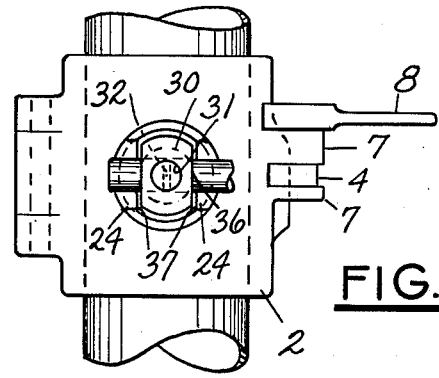
FIG.5
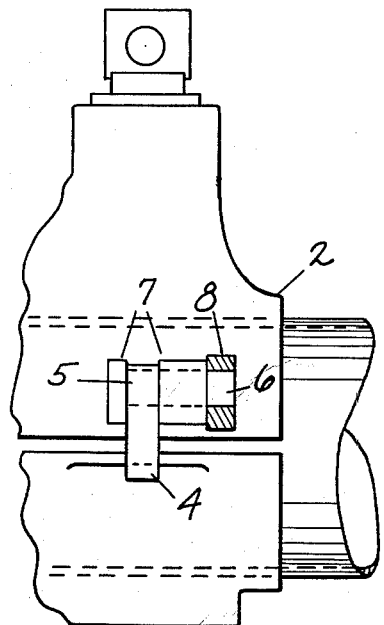
FIG.6
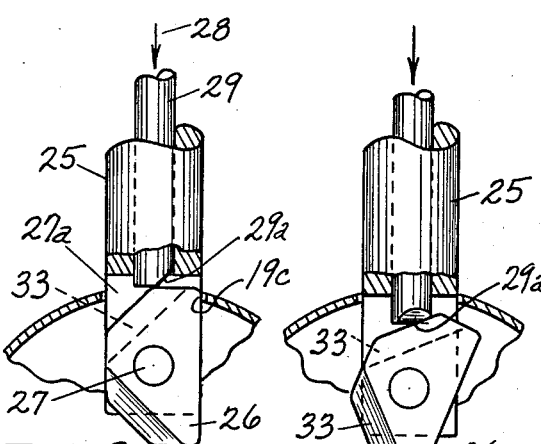
FIG.8　　FIG.9
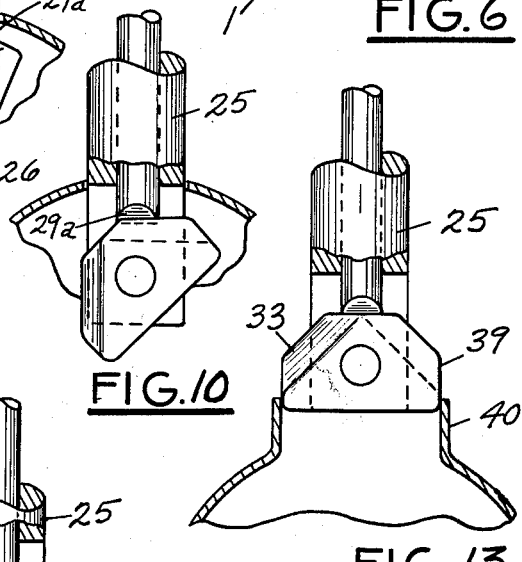
FIG.10
FIG.11
FIG.13
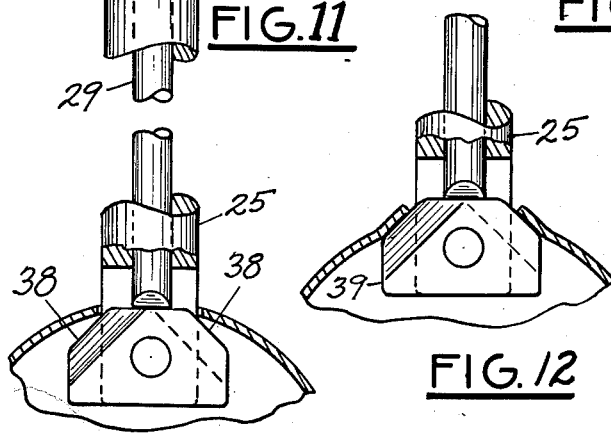
FIG.12
INVENTOR.
Thomas G. Brown
BY
Ralph Hammar
Attorney 3,081,812
BRANCH LINE CONNECTION TOOL
Thomas G. Brown, Erie, Pa., assignor to Reed Manufacturing Company, Erie, Pa., a corporation of Pennsylvania
Filed May 9, 1960, Ser. No. 27,617
7 Claims. (Cl. 153—21)

This invention is intended to facilitate the connection of branch lines to copper and like ductile metal pipe by pulling out of the wall of the pipe integral sleeves to which branch line pipes may be connected. This eliminates the need for T fittings.

The tool is in three parts, (1) a saddle to be clamped to the pipe at the desired location of the branch line and having a bushing extending at the angle of the branch, (2) a hole saw slidably and rotatably received in the bushing for cutting a hole in the pipe of smaller diameter than the branch, and (3) a sleeve forming tool to be locked to the bushing and having its inner end extending through the hole in the pipe and carrying a sleeve pulling head of greater diameter than the hole.

In the use of the tool, the saddle is clamped to the pipe at the desired location of the branch, a hole is cut in the pipe by the hole saw, and the sleeve forming tool is then inserted in the bushing and non-rotatably locked thereto. In order that the sleeve forming tool may be inserted, the head is pivoted so that it extends lengthwise of the tool during its insertion and is swung to the crosswise position after insertion. Upon locking of the sleeve forming tool to the bushing, the bushing and the sleeve are rotated together and threaded out of the saddle and as this is done, the head of the sleeve forming tool pulls the metal around the hole outward in the form of a sleeve of the diameter of the branch. The branch line is connected to the sleeve in the usual manner.

In the accompanying drawing, FIG. 1 is a longitudinal section through a pipe in which an integral sleeve has been formed for connection of a branch line, FIG. 2 is a section on line 2—2 of FIG. 1, FIG. 3 is a section through the saddle clamped to the pipe and with the hole saw in place, FIG. 4 is a similar section through the saddle with the sleeve forming tool in place, FIG. 5 is a top plan view of FIG. 4, FIG. 6 is a side view of FIG. 4, FIG. 7 is a fragmentary top plan showing the relation of the hole saw to the sleeve threaded in the saddle, FIGS. 8–13 show successive steps in the sleeve forming operation, FIG. 14 is an end view of the externally threaded bushing, and FIG. 15 is a section on line 15—15 of FIG. 14.

The saddle which is to be clamped to the pipe at the location of the branch line comprises parts 1 and 2 connected at one side by a hinge pin 3 and at the opposite side by a hook 4 journaled on the crank 5 of a shaft 6 rotatably journaled in lugs 7 on the saddle member 2. The projecting end of the shaft 6 is fixed to a lever 8. The throw of the crank 5 is sufficient to pull the hook 4 into tight engagement with a lug 9 on the saddle part 1 when the handle 8 is swung downward in the position illustrated in FIG. 4 to release the hook when the handle is lifted. In the down position of the handle, the saddle is rigidly clamped to pipe 10 at the location in which the branch is to be connected. The connection and disconnection of the saddle is easily and quickly effected.

The first operation is to cut a hole in the pipe of smaller diameter than the pipe size of the branch line. This is done by a hole saw 11 slidably and rotatably received in the bore 12 of an externally threaded bushing 13 screwed into an internally threaded projection 14 on the saddle part 2. The bore 12 of the bushing may be at right angles to the pipe or at any other desired angle. The hole saw is rotated by a spindle 15 having a sliding fit in the hole saw. The spindle drives the hole saw by a pin 16 opposite ends of which are received in slots 17 and 18 in the hole saw. The inner end of the spindle is provided with a drill point 19 at the outer end of a tapered section 20. As the spindle is rotated, by a suitable tool applied to the hexagonal end 21 of the spindle, the point 19 penetrates the wall of the pipe 10, cutting a small opening 19a at the center of the hole saw 11. Subsequent rotation causes a circular slug 19b to be cut out of the pipe by the hole saw. This slug does not drop into the pipe but is forced onto and retained by the tapered section 20 as a part of the hole cutting operation. The hole saw assembly may be held on the bushing 13 by a locking member 22, journaled on the spindle 15 and having gripping lugs 23 which engage segmental lugs 24 on the upper end of the bushing. Before starting the cutting operation, the locking member is swung to the position in which the lugs 23 and 24 are engaged and the desired cutting pressure is applied by screwing the bushing 13 into the projection 14. At the end of the hole cutting operation, the locking member is swung to the position in which the lugs 23 and 24 are disengaged, after which the hole saw is lifted out of the bore 12 of the bushing. The slug 19b which has been cut out of the pipe comes out with the hole saw and can easily be removed from the projection 20 on the inner end of the spindle 15. Even if the projection 20 is omitted, the slug may come out with the hole saw. The removal of the slug is made easier by the elongated slots 17 and 18 which permit the spindle to be moved outward to a position in which the slug is clear of the cutting edges of the hole saw.

At the end of the hole cutting operation, there is a hole 19c in the pipe of smaller diameter than the pipe of the branch. The next operation is to draw or pull the metal around the margin of this hole outward into an integral sleeve having a telescoping fit with the branch line pipe so that a liquid tight connection can be made. This is done by a sleeve forming tool having a body 25 which is inserted in the bore 12 of the bushing. The body 25 is of the same or slightly less diameter than the hole 19c cut by the hole saw 11 so that its inner end freely passes through the hole as shown in FIG. 8. While this is being done, the sleeve forming head 26 is pivoted about its pivot 27 into a slot 27a extending lengthwise into the end of the body 25. In this position the head does not project outside the diameter of the body. After the inner end of the body has passed completely through the hole 19c cut by the hole saw, the head 26 is cammed to the crosswise position by exerting a force in the direction of arrow 28 on a pin 29 slidably carried in the body. The outer end 30 of the body has a hole 31 through which a screw driver or similar tool may be inserted to exert the required force in the direction of the arrow 28. The outer end of the pin 29 may be slotted as indicated at 32 to center the screw driver and to permit turning of the pin to assist the cam action. The inner end of the pin is chamfered at 29a. When the chamfer is exactly parallel to the pin 27 as shown in FIG. 8 (or at exactly right angles to the pin 27), a force in the direction of arrow 28 acts on dead center and has no cam action. By turning the pin 29 slightly as shown in FIG. 9, contact is made with one of the bevelled surfaces 33 on the turning head and a torque is exerted pivoting the head about pivot pin 27, as illustrated in FIGS. 9 and 10. When the head 26 reaches the horizontal position illustrated in FIG. 11, the upper end of the pin 29 drops below a cross bore 34 in the upper end of the body 25 and permits the insertion of a handle 35 by which the body 25 may be turned. When this happens, the upper end 30 of the body 25 is moved downward between the ears 24 on the bushing 13 and is non rotatably connected to the bushing by flats 36 on the body which engage flats 37 on the ears 24. As the body 25 is rotated, the bushing likewise is rotated and screws the bushing out of the projection 14 in the saddle. This brings chamfered or inclined surfaces 33 and inclined edges 38 on the turning head into engagement with the metal surrounding the hole 19c cut by the hole saw and gradually pulls this metal outward to form a sleeve 40 as indicated in FIGS. 11, 12 and 13. The edges 38 are rounded to provide relief. During this operation, the bevelled surfaces 33 on the head 26 are in front of the edges 38 as regards the direction of rotation of the head and engage and form the metal. The bevelled surfaces 33 pull the metal out to form the integral sleeve around the hole. The inside diameter of the sleeve is sized by edges 39 which are parallel to the axis of rotation of the sleeve forming tool. The length of the sleeve pulled out of the pipe is controlled by the slope of the inclined edges 38. The included angle between the edges 38 is illustrated as 90°. Larger and smaller included angles have been used. The smaller included angles result in sleeves of longer length. The larger included angles require more effort because the action is more abrupt.

As shown in FIGS. 1 and 2, the sleeve 40 pulled out of the pipe is highest at edges 41 in line with the length of the pipe and is lowest at intermediate points 42.

The tool is usable with any ductile pipe such as copper. With this tool it is possible to locate branch lines at any point along a pipe. This is advantageous in the installation of new branch lines in old plumbing. It also simplifies the plumbing of new installations because the main lines can be installed as part of the rough plumbing and the branch lines put in later when the building reaches the stage for completion of the plumbing. In either case, the cost is materially less than conventional pipe fittings.

The cutting of the initial hole 19c and the subsequent forming of the sleeve 40 are guided by the bore 12 of the bushing 13. The load is balanced, insuring not only accuracy but reduction in wear. The accuracy is also improved by using the bushing 13 as a guide for the hole cutting tool and also as a guide for the sleeve forming tool. When the handle 35 is in place, the pin 29 locks the head 26 in the position illustrated in FIG. 4 so the head cannot pivot about pin 27 even if the load on the sleeve forming tool is not balanced.

What is claimed as new is:

1. Apparatus for forming a transverse externally projecting sleeve on a ductile tube comprising a saddle, means for holding the saddle on the tube at the location at which the sleeve is to be formed, the saddle having an internally threaded projection and a bushing screwed in said projection having a bore with an axis extending in the direction of the desired sleeve, a hole saw rotatably receivable in said bore for cutting a hole in the tube, a pressure applying connection from the bushing to the hole saw whereby the desired hole cutting pressure may be applied to the saw by screwing the bushing into the projection, a sleeve forming tool having a body alternatively receivable in said bore with its inner end extending through the hole in the tube and its outer end accessible from the outside of the projection, a head pivoted on said inner end of said body and movable between positions lengthwise and crosswise of said body, the head in its lengthwise position lying within the diameter of said hole so the inner end of said head can be inserted into the tube through said hole, the head in its crosswise position having portions projecting outside the diameter and beneath the margin of said hole, a pin in said body having a cam faced inner end for engaging the head to one side of its pivot and for pivoting the head from the lengthwise to the crosswise position, the outer end of the pin being accessible from outside said projection for the application of a pivoting force to the head, means for locking the body and bushing together and for applying a turning force thereto in the direction to unscrew the bushing from said projection and move the bushing and head away from the tube, the head having bevelled surfaces engaging the metal of the tube around said hole and pulling a sleeve out of said metal as the bushing and head move away from the tube.

2. Apparatus for forming a transverse externally projecting sleeve in the side of a ductile tube having a hole in a side wall thereof of diameter smaller than the bore of the tube and the sleeve, comprising a saddle having an internally threaded projection and an externally threaded bushing screwed in said projection, means for holding the saddle in fixed relation to the tube with the bushing aligned with said hole, a sleeve forming tool slidably receivable in said bore with its inner end extending through the hole in the tube and its outer end accessible from the outside of the projection, a head on the inner end of said tool and movable between positions lengthwise and crosswise of said tool, the head in its lengthwise position lying within the diameter of said hole so the inner end of said tool can be inserted into the tube through said hole, the head in its crosswise position having portions projecting outside the diameter and beneath the margin of said hole, means for moving the head from the lengthwise to the crosswise position, means for locking the tool and bushing together and for applying a turning force thereto in the direction to move the bushing and head away from the tube, the head having bevelled surfaces engaging the metal of the tube around said hole and pulling a sleeve out of said metal as the bushing and head move away from the tube.

3. Apparatus for forming a transverse externally projecting sleeve in the side of a ductile tube having a hole in a side wall thereof of diameter smaller than the bore of the tube and the sleeve, comprising a saddle having an internally threaded projection and an externally threaded bushing screwed in said projection, means for holding the saddle in fixed relation to the tube with the bushing aligned with said hole, the inner end of said body having pivoted thereon a head of greater length than the diameter of said hole and movable between positions lengthwise and crosswise of said body, the head in its lengthwise position lying within the diameter of said hole so the inner end of said head can be inserted into the tube through said hole, and the head in its crosswise position having portions projecting outside the diameter and beneath the margin of said hole, means for moving the head from the lengthwise to the crosswise position, means for rotating the tool about its axis, means in thrust relation to the tube for gradually moving the tool out through said hole, the head having bevelled surfaces engaging the metal of the tube around the hole and lifting the same to pull a sleeve out of said metal, said bevelled surfaces merging into edges on the head inclined at an acute angle to the axis of the tool, and said head having at its outer ends surfaces parallel to the axis of the tool for sizing said sleeve.

4. Apparatus for forming a transverse externally projecting sleeve in one side of a ductile metal part having a hole therein of diameter smaller than the sleeve, comprising a sleeve forming tool having a body with its inner end extending from said one side of the part through said hole to the opposite side of said part, said inner end having a slot therein, a head in said slot, means pivoting the head on the body crosswise of the slot, the head being movable between positions lengthwise and crosswise of said body, the head in its lengthwise position lying within the diameter of said hole so the inner end of said head can be inserted into the tube through said hole, the head in its crosswise position having portions projecting outside the diameter and beneath the margin of said hole, the projecting portions having edges inclined at an acute angle to said body and having bevelled surfaces merging into said edges for engaging the metal around said hole, a pin in said body having a cam faced inner end engaging one of said bevelled surfaces for pivoting the head from the lengthwise to the crosswise position, the outer end of the pin being accessible from outside for the application of a turning force to the head, said body having a cross bore in its outer end for receiving a handle for turning said body, said pin in the lengthwise position of said head projecting into said cross bore to block insertion of the handle, and means for moving said tool gradually out of said hole as it is turned by said handle, said bevelled surfaces engaging the metal around said hole and pulling a sleeve out of said metal.

5. Apparatus for forming a transverse externally projecting sleeve on a ductile tube comprising a saddle, means for holding the saddle on the tube at the location at which the sleeve is to be formed, the saddle having an internally threaded projection, a bushing threaded in said projection having a bore with an axis extending in the direction of the desired sleeve, a hole saw adapted to be rotatably receivable in said bore for cutting a hole in the tube, a drive spindle for the saw slidably and non rotatably mounted within the saw and having a drill point projecting beyond the saw to cut a center hole in the tube, the slug cut by the hole saw being forced onto said point and the spindle being slidable relative to the hole saw to move the slug beyond the hole saw for removal of the slug from said point, a pressure applying connection from the bushing to the hole saw whereby the desired hole cutting pressure may be applied to the saw by screwing the bushing into the projection, a sleeve forming tool having a body alternatively receivable in said bore with its inner end extending through the hole in the tube and its outer end accessible from the outside of the projection, a head pivoted on said inner end of said body and movable between positions lengthwise and crosswise of said body, the head in its lengthwise position lying within the diameter of said hole so the inner end of said head can be inserted into the tube through said hole, and the head in its crosswise position having portions projecting outside the diameter of said hole, a pin in said body having a cam faced inner end for engaging the head to one side of its pivot and for pivoting the head from the lengthwise to the crosswise position, the outer end of the pin being accessible from outside said projection for the application of a pivoting force to the head, means for locking the body and bushing and for applying a turning force thereto in the direction to unscrew the bushing from said projection and move the bushing and head away from the tube, the head having bevelled surfaces engaging the metal of the tube around said hole and pulling a sleeve out of said metal as the bushing and head move away from the tube.

6. Apparatus for forming a transverse externally projecting sleeve in the side of a ductile tube having a hole in a side wall thereof of diameter smaller than the bore of the tube and the sleeve, comprising a saddle having an internally threaded projection and an externally threaded bushing screwed in said projection, means for holding the saddle in fixed relationship to the tube with the bushing aligned with said hole, a sleeve forming tool having a body slidably guided in said bushing with its inner end extending through the hole in the tube and its outer end accessible from the outside of the bushing, the inner end of said body having mounted thereon a head movable relative to said body between a retracted position lying within the diameter of said hole so the inner end of said head can be inserted through said hole and an extended position having portions projecting outside the diameter of said hole and underlying the metal of said tube around said hole, means for moving said head from said retracted position to said extended position, and means for non rotatably locking said body and bushing and unscrewing the bushing from said projection to gradually move the head out of said hole to pull a sleeve out of said metal around the hole.

7. Apparatus for forming a transverse externally projecting sleeve in one side of a ductile metal part having a hole therein of diameter smaller than the sleeve, comprising a sleeve forming tool having a body with its inner end extending from said one side of the part through said hole to the opposite side of said part, said inner end having a slot therein, a head in said slot, means pivoting the head on the body crosswise of the slot, the head being movable between positions lengthwise and crosswise of said body, the head in its lengthwise position lying within the diameter of said hole so the inner end of said head can be inserted into the tube through said hole, the head in its crosswise position having portions projecting outside the diameter and beneath the margin of said hole, the projecting portions having edges inclined at an acute angle to said body and having bevelled surfaces merging into said edges for engaging the metal around said hole, a pin in said body having a cam faced inner end engaging one of said bevelled surfaces for pivoting the head from the lengthwise to the crosswise position, the outer end of the pin being accessible from outside for the application of a turning force to the head, said body having a cross bore in its outer end for receiving a handle for turning said body, said pin in the lengthwise position of said head projecting into said cross bore to block insertion of the handle and said pin in the crosswise position of the head blocking turning of the head, and means for moving said tool gradually out of said hole as it is turned by said handle, said bevelled surfaces engaging the metal around said hole and pulling a sleeve out of said metal.

References Cited in the file of this patent

UNITED STATES PATENTS

| | | |
|---|---|---|
| 736,647 | Staiger | Aug. 18, 1903 |
| 1,080,519 | Schuermann | Dec. 2, 1913 |
| 1,415,043 | Mueller et al. | May 9, 1922 |
| 1,656,277 | Haak et al. | Jan. 17, 1928 |
| 2,213,574 | Weston | Sept. 3, 1940 |
| 2,736,949 | Kraemer | Mar. 6, 1956 |